April 17, 1962     P. S. NISSENSON     3,030,574
POSITION INDICATOR

Filed Feb. 26, 1957     2 Sheets-Sheet 1

WITNESSES
Robert C. Baird
Donald J. Smith

INVENTOR
Phineas S. Nissenson.
BY
Arthur T. Stratton
ATTORNEY

United States Patent Office 3,030,574
Patented Apr. 17, 1962

3,030,574
POSITION INDICATOR
Phineas S. Nissenson, Pittsburgh, Pa., assignor to Westinghouse Electric Corporation, East Pittsburgh, Pa., a corporation of Pennsylvania
Filed Feb. 26, 1957, Ser. No. 642,546
14 Claims. (Cl. 324—34)

The present invention relates to an inductance type position indicating arrangement for a magnetic element and, more particularly, to an indicator of the character described adapted for use with a substantially linearly moving element in the presence of another magnetic field.

Heretofore, it has been the practice to arrange a position indicator of this type in the form of a longitudinal series of coils would axially on a continuous magnetic core. The core was then arranged in a manner such that the element whose position was to be indicated was made to travel longitudinally of the magnetic core. As the element moved along the length of the core, paths of lower reluctance for the magnetic fields produced by the individual coils were successively provided for each one of the coils. Accordingly, a progressively changing inductance characteristic of the entire series of coils is afforded as the element is moved relative thereto, which inductance increases or decreases depending upon the directional movement of the element. By comparing the value of the inductance at any given instant during the travel of the element, with that obtained at a reference position thereof, an indication of the position of the element is obtained at the aforesaid given instant, or at any other desired position thereof throughout its travel.

Although prior arrangements of position indicators, which utilize a series of coils as aforesaid, have operated satisfactorily in many applications, these prior arrangements have failed to yield reliable indications of the positions occupied by the moving element with which they are associated when that element is passed through one or more extraneous magnetic fields. This follows from the fact that the magnetic field at least partially saturates the moving element in these cases, thereby rendering it less able or completely unable to change the inductance of those individual coils in the aforesaid series of coils when the moving element extends in the external magnetic field. Because of this saturation, or near saturation, as the case may be, the moving element ceases to provide a path of lower reductance for the individual magnetic fluxes produced by the series of coils of the position indicator.

As a result the total inductance of the position indicating coils not only does not increase as the moving element successively bridges the coils, but in some cases, markedly decreases. This follows from the fact that the saturating flux extends into other portions of the moving element with the result that the inductance of the coils previously bridged by the moving element is effected.

In view of the foregoing, it is an object of the invention to provide a novel and efficient position indicating arrangement.

Another object of the invention is to provide a position indicator of the character described with means for permitting the operation thereof within a magnetic field produced by means other than the position indicating coils.

A further object of the invention is to provide a novel position indicating arrangement adapted for use with a movable element, a portion of which is movable either in or through an extraneous magnetic field.

Another object of the invention is to provide a novel type of linear motion indicator adapted for operation within a sealed system.

These and other objects, features and advantages of the invention will be made apparent during the ensuing description of exemplary forms thereof, with the description being taken in conjunction with the accompanying drawings, wherein.

The position indicating coils of the invention, are arranged in a manner to take advantage of the fact that saturation in a magnetic material induced by a magnetic field is unidirectional. That is to say the effect of saturation of a magnetic core associated with an electromagnetic coil, for an example, exists only in the direction parallel to the direction of flux of the coil causing this saturation. The effect of saturation of the magnetic core or member therefore does not exist in a direction perpendicular, for an example, or at some other substantial angle to the axis of a saturating magnetic field. In order to exploit this principle, a series of position indicating coils in one form of the invention is arranged such that the individual coils thereof are orientated with their axes at an angle to the longitudinal axis of the moving member whose position is being indicated. Therefore, as the moving member encompasses an individual position indicating coil, the path of the flux induced in the member by the coil lies at an angle to the longitudinal axis of the moving member. Thus, when the moving member passes through one or more extraneous magnetic fields, for example, one arranged to move the element or otherwise to control the motion thereof, the fluxile paths of the fields usually lie longitudinally of the moving element. Accordingly, the low reluctance paths afforded to the individual position indicating coils by the member are not affected by the aforesaid magnetic field since the low reluctance paths are disposed at an angle to the axis of the field or fields, as the case may be.

Figure 1:
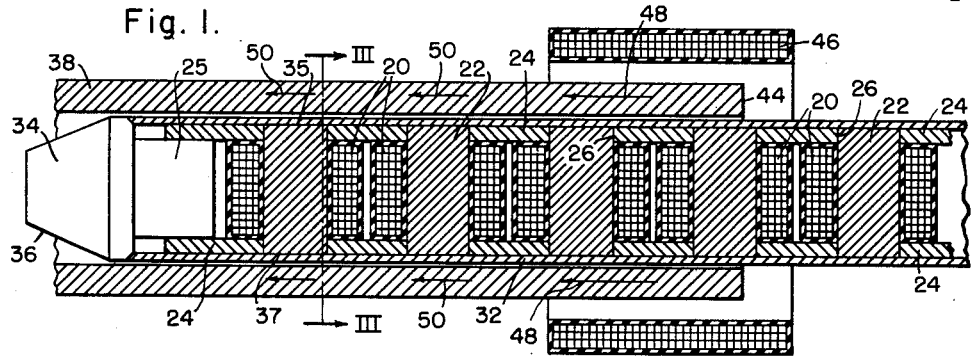
FIGURE 1 is a partial substantially central longitudinal sectional view, of one form of position indicator constructed in accordance with the invention.
Figure 2:
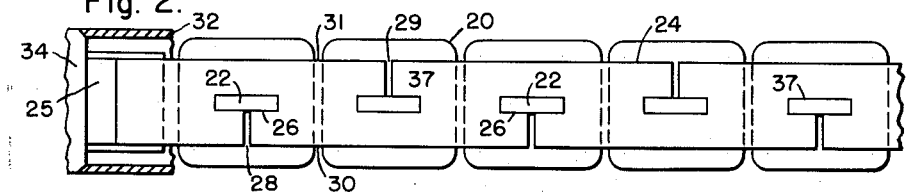
FIG. 2 is a side elevation of the position indicating coils of FIG. 1, parts having been removed and other parts having been broken away for purposes of illustration.
Figure 3:
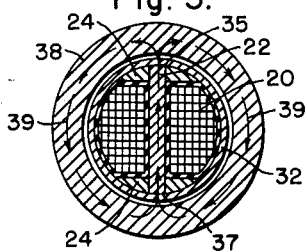
FIG. 3 is a cross sectional view of the position indicating arrangement of FIG. 1 taken along reference lines III—III thereof.

Referring now more particularly to FIGS. 1 to 3 of the drawings, the illustrative form of the invention exemplified therein comprises a series of position indicating coils 20, each wound upon a core member 22 fabricated from a magnetic material. Obviously, a greater or lesser number of coils 20 than that shown can be employed and these coils can be spaced close or farther apart depending upon the lengths of their individual turns and the width of the core members 22. The core members 22, in turn, are transversely mounted upon a pair of parallel side members 24 and spaced along the length of the side members to form a ladder-type construction. The side members 24 are fabricated from non-magnetic material and slidably engage, adjacent an end thereof, an end member 25 and are secured at the other end thereof by means presently to be elaborated upon in connection with FIG. 7 of the drawings. More specifically, the core members 22 are inserted at the respective ends thereof into aligned pairs of apertures 26 formed in the side members 24, respectively, and likewise spaced along the length thereof. Each of the side members 24 is provided with a series of transversely extending slots 28 and 29 extending inwardly and alternately from lateral sides 30 and 31 respectively, of the side members 24 to the apertures 26 in order to eliminate the effect of the shorted turn, where the side members 24 are fabricated from an electrically conductive material, as in one example of the invention, and since the coils 20 are energized by a fluctuating or alternating electrical potential. It will be appreciated that any rising and falling potential can be utilized to energize the coils 20 so long as the fluctuations thereof are rapid enough to produce a usable inductive effect. The slots 28 and 29 are deposed in each of the side members in alternation, as aforesaid, in order to increase the structural strength of the side members. Although the position indicator of the invention is operative in a satisfactory manner, when the side members 24 are fabricated from a non-magnetic electrically conductive material and the slots 28 and 29 are omitted, it has been found that use of the slots 28 and 29 increases the total inductance of the coils 20 by eliminating the shorted turn effect.

For operation within a sealed system or in order to protect the individual coils 20 from engagement with the moving element presently to be described, the coils and the aforedescribed ladder arrangement, upon which the coils are mounted, are enclosed within a tubular casing 32, fabricated from a non-magnetic material and having an end thereof secured and sealed to a plug member 34. The other end of the tubular casing 32 is sealed in a similar manner or alternatively, in the manner presently to be described. The plug member 34 is formed with an outwardly extending tapered portion 36, in one example of the invention, in order to facilitate movement of certain forms of elements whose position is to be indicated relative to the position indicating coil arrangement.

The ladder arrangement of the coils 20 is mounted adjacent and desirably parallel with the direction of travel of a moving element 38, which in this example is of generally tubular construction and is fabricated at least partly from a magnetic material. The moving element 38 thus is arranged to successively increase the inductance of each of the position indicating coils 20 by providing a path of reduced reluctance for at least a portion of the magnetic flux thereof. In furtherance of this purpose, the moving element 38 can be arranged to at least partly surround the coil arrangement or alternatively, as better shown in FIG. 3 of the drawings, can be provided in the form of a tubular member which is relatively closely spaced from the tubular casing 32 and completely surrounds the same when the coil arrangement is inserted in the tubular element 38 by movement of the latter. In this latter arrangement, a circumferential path of lower reluctance is afforded for each of the cores 20 when bridged by the element 38, as indicated by arrows 39 (FIG. 3).

It will be appreciated that the ladder arrangement, including the position indicating coils 20, is provided with a length substantially equivalent to that of the desired travel of the moving element 38. Therefore, as the element 38 moves throughout its course, in this example, in a linear direction, the total inductance of the ladder coil arrangement is increased or decreased, respectively, as the moving element 38 bridges more or less of the position indicating coils 20. In order to indicate inductive changes of the position indicating coils 20, as the movable element 38 is moved relative thereto, the coils 20 are connected in electrical series to suitable means for measuring and indicating the aforesaid changes in their inductance and hence, for showing the position of the moving element 38 at the time the measurement is indicated. The coils 20 desirably are connected into a series arrangement such that the extremities 35 or 37 (FIG. 1) of the transverse cores 22 at the side members 24, respectively, are all of the same polarity. Although a lesser total inductance is evinced by the position indicating coils when so arranged, a greater change in inductance with movement of the linear element is shown than when adjacent ends 35 and 37 of a pair of cores are opposite magnetic poles. This follows from the fact that when the coils are so arranged virtually no flux of a given coil can flow through the cores of adjacent coils, and accordingly, any high permeability path is afforded solely by the moving element 38, since the other component parts of the structure are formed formed from non-magnetic materials, as aforesaid.

Figure 4:
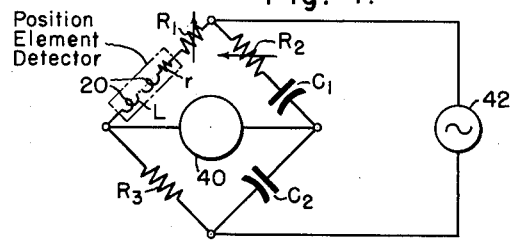
FIG. 4 is a schematic circuit diagram of one form of an inductance bridge adapted for measuring the change in inductance of the position indicating coils in order to indicate the position of the moving element.

As better shown in FIG. 4 of the drawings, one circuit arrangement for so measuring the change in inductance of the position indicating coils is shown schematically therein. The aforesaid circuit arrangement is provided in this example in the form of a bridge network in which the position indicating coils 20 are coupled in series with a variable resistance $R_1$ in one arm of the bridge network, with the adjacent arm thereof being composed of a fixed capacitor $C_1$ and a variable resistance $R_2$. A voltage meter 40 or other suitable indicating means or alternatively, suitable means (not shown) for controlling the movement of the moving element 38, is coupled across the aforesaid arms of the bridge which arms are opposed respectively by a fixed resistor $R_3$ and a fixed capacitor $C_2$. The aforesaid pairs of opposing arms of the bridge are then coupled to a source of fluctuating or alternating current potential 42 for operating the bridge circuit and for supplying operative potential to the position indicating coils 20. By appropriate adjustment of the variable resistances $R_1$ and $R_2$, the bridge circuit of FIG. 4 is brought into electrical balance with both the inductance L of the position indicating coils 20 and with the ohmic resistances $r$ thereof, at a reference position of the moving member 38. Such position can be selected such that the forward end 44 (FIG. 1) of the moving element 38 is adjacent the end member 25, that is to say at an end of the series of coils, of the ladder-type coil arrangement such that all of the position indicating coils are exposed, or at any other given position throughout the course of the moving element 38.

In the balanced position of the bridge, the following well-known relationships exist;

$$C_2R_3=C_1(R_1+r)$$

where $r$ is equal to the ohmic or direct current resistance of the position indicating coils 20, and $$L=C_2R_2R_3$$

where L equals the inductance of the position indicating coils 20. However, for the purpose of determining the position of the displaced movable element relative to its reference position, only the change in inductance of the coils 20 is important and not the absolute value of their inductance. This change in inductance is reflected in the unbalance potential indicated by the voltage meter 40.

With the bridge circuit balanced as described heretofore, and with the meter 40, of course, showing a zero reading, the amount of unbalance imparted to the bridge circuit of FIG. 4 as the linear element 38 moves relative to the position indicating coils 20 is reflected by the unbalance potential indicated by the meter 40. It follows, then, that the amount of unbalance potential indicates the position of the moving element 38 relative to the aforesaid reference position thereof. Accordingly, the meter 40 can be calibrated such that the distance of the moving element 38 from its reference point, and from the associated point of bridge balance, is indicated directly.

Figure 5:
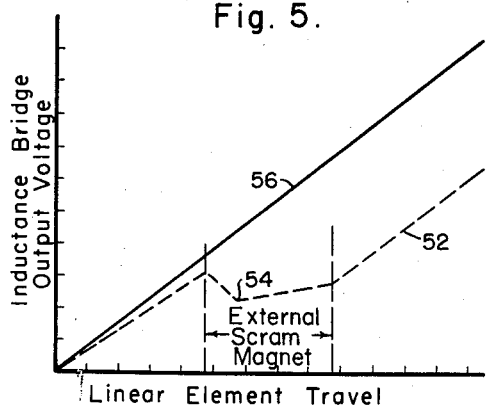
FIG. 5 is a graphical illustration of the direction in total inductance of conventionally arranged indicating coils caused by the presence of a saturating magnetic field.
Figure 6:
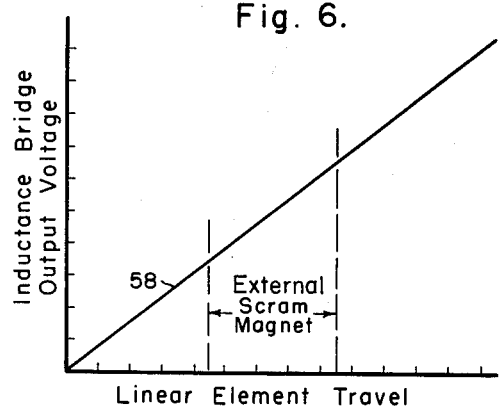
FIG. 6 is a graphical illustration of the variation in inductance of the disclosed position indicating coils with movement of the element whose position is being measured.

Referring now to FIGS. 1, 5 and 6 of the drawings, in certain applications of the invention, the position indicating coil arrangement illustrated herein is often employed with or utilized adjacent to one or more magnetic fields, represented in this example by an electromagnet 46. The electromagnet 46 or additional magnetic means such as the stator 60 (FIG. 7) may be arranged to impart linear movement to the moving element 38 or to operate a suitable mechanism, one form of which is presently to be described, for otherwise controlling the movement of the element 38. In still other applications to which the invention is readily adaptable, the electromagnet 46 comprises the stator or a plurality of solenoids of a direct current linear motion device (not shown) which is arranged in a known manner to impart linear movement to the element 38. When the moving element 38 is arranged for movement adjacent a magnetic field, as aforesaid, the field frequently is arranged such that magnetic flux is induced longitudinally of the linear element 38, as indicated by arrows 48. When the end 44 of the element enters this field, the flux may be extended for some distance along the length of the moving element 38, as shown by arrows 50. As pointed out heretofore, the flux of the electromagnet or other field at least partly saturates the magnetic movable element 38. Therefore, in those prior arrangements wherein the indicating coils were orientated such that their axes were parallel to the axis of the external field, or in this case, to the longitudinal axis of the moving element 38, the movable element ceases to provide a path of lower reluctance for the magnetic fields produced by the individual position indicating coils. Accordingly, the inductance of prior position indicators do not vary linearly with the extent of travel of the element 38 and the true position thereof was not shown. In the position indicator of the invention however, at least those coils of the indicator which are adjacent the extraneous magnetic fields are disposed such that their fluxile paths through the moving element 38 are at angles to the respective fluxile paths of the extraneous fields through the element.

As shown in FIG. 5 of the drawings, in prior position indicators employing a series of indicating coils disposed axially of the moving element and of an extraneous magnetic field, such as that produced by the electromagnet 46 (FIG. 1), the saturation induced in the moving element by the electromagnet 46 produced a non-linear and varying function of the inductance of the position indicating coils relative to the position of the linear element. Accordingly, in prior position indicators of this type, an inductance curve 52 has been obtained which represents the change in bridge (FIG. 4) output voltage with travel of the linear element 38, which voltage varies non-linearly with the change in inductance of the position indicating coils. However, because of the aforesaid extraneous magnetic field, the curve 52 is distorted with the result that the true position of the linear element adjacent the electromagnetic field could not be determined. Thus, as the linear element, when associated with conventionally arranged coils, in this case, approached a saturating field, a decrease in the total inductance of the position indicator is evinced, as shown by a dip 54 in the curve 52. As noted heretofore, this decrease in inductance is caused by the fact that the saturating flux of the extraneous field extends axially some distance through the linear member when the forward end thereof is brought adjacent the field and also by the fact that the axial core of prior indicating coil arrangements also was at least partially saturated adjacent the extraneous field. The extent of distortion created by the electromagnet in these prior arrangements is shown by a comparison of the curve 52 with a curve 56, which latter curve shows a linear relationship between the changing bridge (FIG. 4) output and travel of the linear element when the external magnetic field is removed.

As described heretofore, this problem is overcome by disposing the position indicating coils such that their longitudinal axes, that is to say the axes of their fields, at an angle to that of the extraneous magnetic field. Accordingly, since the saturation imparted by the extraneous flux is unidirectional, this saturation does not then interfere with the individual fields of the position indicating coils when the latter are so arranged. Consequently, as better shown in FIG. 6 of the drawings, a straight line curve 58 is produced by the varying bridge (FIG. 4) output which shows a linear relationship between the changing inductance of the position indicating coils and travel of the linear element whose position thereby is being shown despite the presence and influence of the external electromagnet 46 (FIG. 1). The curve 58, together with the curve 52 (FIG. 5), were determined from experimental data wherein the position indicator of the invention and a conventional position indicator were employed with identical position and inductance indicating arrangements and maintained in the same axial direct-current electromagnetic field. Thus, it has been shown experimentally that a saturating flux of an extraneous magnetic field has substantially no effect upon the flux paths of the individual position indicating coils when these coils are disposed such that the axes of their fields each lie at a substantial angle to that of the saturating field.

Figure 7:
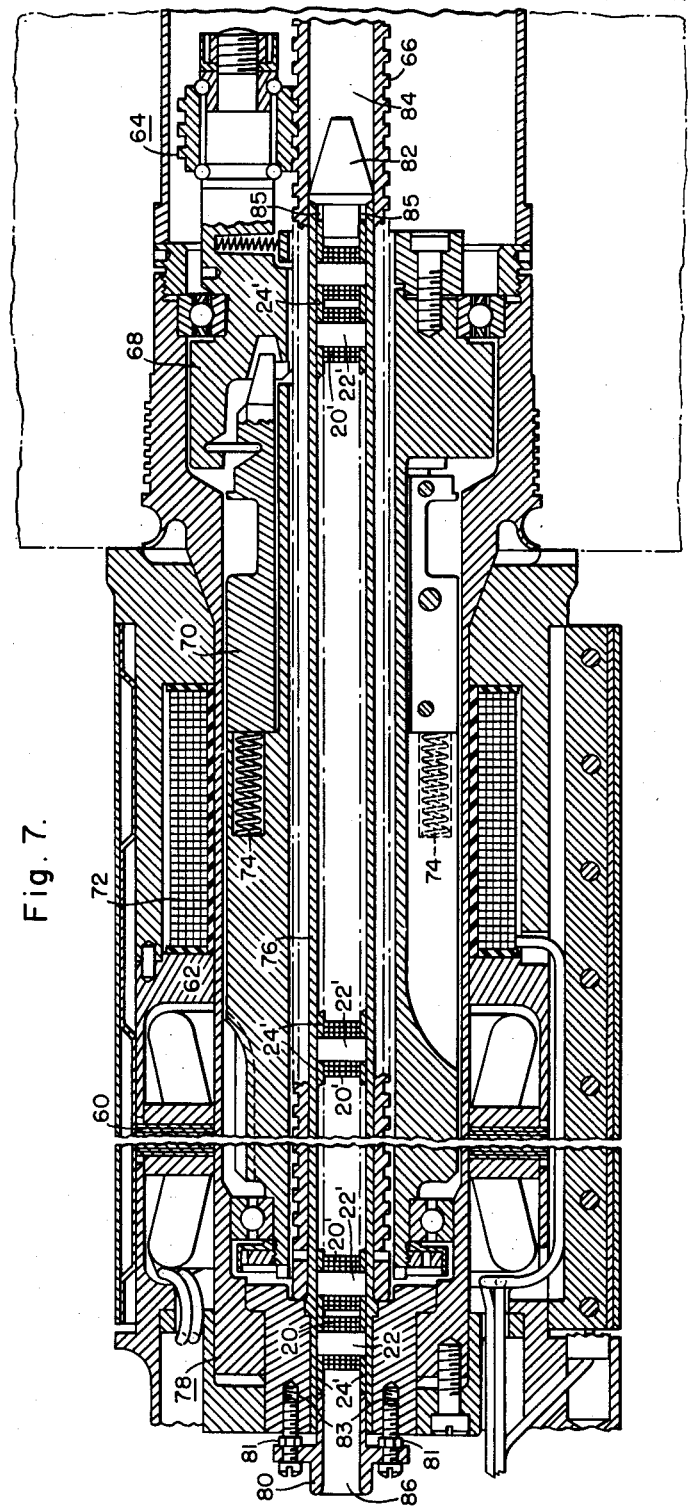
FIG. 7 is a substantially central longitudinal sectional view of a linear motion device with which the position indicator of the invention is associated in one application thereof.

In FIG. 7 of the drawings, one application of the invention in connection with a linear motion device is illustrated therein. In this arrangement, the position indicating coils are associated with the linear motion mechanism described and claimed in a copending application of Erling Frisch, Serial No. 640,501, filed February 15, 1957, now Patent No. 2,882,428, and assigned to the assignee of the present application. The latter-mentioned linear motion device accordingly comprises a stator 60, a salient-pole type rotor 62 and a roller nut driving mechanism indicated generally by the reference character 64. The aforesaid driving mechanism is adapted to engage and to move a linearly moving element or lead screw 66. The driving mechanism 64 is supported by a plurality of pivoted arms 68 which are capable of limited movement about their pivotal points in order to engage or to disengage the driving mechanism 64 relative to the lead screw 66. As explained more fully in the aforesaid application, the pivotal movement of each of the arms 68 is controlled by a latching member 70. A portion of the member 70 extends into the effective field of a direct current electromagnet 72 arranged, when energized, to move the latching member leftwardly against the action of an associated biasing spring 74.

In this arrangement of the invention, the lead screw 66 is provided in the form of an elongated threaded tubular element into which the aforedescribed ladder-type arrangement of position indicating coils is inserted. Each of the position indicating coils 20' accordingly is orientated at an angle which, in this example, is desirably perpendicular to the electromagnet 72. The total number of the position indicating coils 20', with each being wound upon a core member 22', and the lengths of the side members 24' are selected such that the position indicator extends substantially along the entire desired length of travel of the lead screw 66.

In this arrangement then, the position indicating coils 20', their associated cores 22', and the side members 24' are mounted within an elongated tubular casing 76 fabricated from a non-magnetic material. The casing 76 at one end thereof is rigidly secured to the framework 78 of the linear motion device as by welding. A tubular mounting bracket 80 is secured to an extremity of the side members 24' and in cooperation with the mounting bolt and nut arrangements 81, serves to position the side members and coils 20'. The mounting bolts and tapped holes 83 are provided in such length that a desired degree of axial adjustability is imparted to the ladder structure whereby it can be positioned precisely relative to the lead screw 66 at a selected reference position thereof.

For this purpose, the side members 24' slidably engage flattened surfaces 85 of the tapered plug member 82. The other or free end of the tubular casing 76 is secured to a tapered plug member 82, the tapered portion of which facilitates insertion of the tubular casing 76, and position indicating coils 20' enclosed therein, into the hollow lead screw as the latter is moved relative to the position indicating coils by the driving mechanism 64. In the arrangement of FIG. 7, the lead screw 66 is illustrated in its inmost position relative to the linear motion device such that the position indicator arranged therein according to the invention is fully inserted into an interior channel 84 of the lead screw 66. At this position of the lead screw, substantially all of the position indicating coils 20' are enclosed by the lead screw, and accordingly, a maximum inductance is evinced by the position indicating arrangement which in turn produces a maximum unbalance voltage output of the bridge circuit (FIG. 4) or other inductance indicating and measuring arrangement. The coils 20' are internally connected in electrical series, as described in connection with FIG. 1 of the drawings, and the electrical leads therefor are brought out through the open end of the tubular casing 76 and through the clamping means 80, which is provided for this purpose with an aperture 86 extending therethrough and communicating with the tubular casing 76.

It can be seen, then, in this exemplary application of the invention, that each of the position indicating coils 20' are disposed with their fields at an angle to that of the electromagnetic coil 72, with the result that the fluxile paths of the position indicating coils 20' are likewise disposed at an angle to the unavoidably saturating fluxile path of the electromagnet 72, since the latter is arranged axially of the lead screw 66. In the event that the position indicator arranged in accordance with the invention is employed other types of linear motional devices, for an example, one (not shown) employing a direct current stator or a wound rotor, it is contemplated likewise that the position indicator of the invention be arranged such that the individual coils thereof are disposed at an angle to that of the rotor or the stator of the latter-mentioned devices.

From the foregoing, it is apparent that a novel and efficient position indicating arrangement has been disclosed herein. The position indicator of the invention is arranged such that the indicated position of an element moving relative thereto is not distorted by the presence of an extraneous magnetic field. Although the invention has been described in connection with certain forms of a linear motion device, it will be apparent that the invention is not so limited to such applications, but is readily adaptable for use in any position indicating application wherein the moving element to be measured is moving in a prescribed path. Obviously, the ladder type arrangement of position indicating coils according to the invention, can be arranged to form an arcuate or other configuration thereof as determined by the aforesaid prescribed path of the moving element whose position or progress of travel is desired to be shown. Therefore, numerous embodiments of the invention exemplified herein will occur to those schooled in the art without departing from the scope of the appended claims.

I claim as my invention:

1. In combination with a movable magnetic element mounted for movement in an extraneous magnetic field, a plurality of position indicating coils each disposed in gap bridgable relationship to said moving element along the length of travel thereof, magnetic field producing means located to induce said extraneous magnetic field along at least one path in said element, said coils being further disposed such that the individual fluxile paths thereof through said magnetic element are always disposed at angles to that of said extraneous field, and circuit means for coupling said position indicating coils to a source of fluctuating potential and to external circuitry for measuring the inductance of said coils.

2. A position indicator adapted for use in an extraneous magnetic field for indicating the position of a movable magnetic element mounted for movement in a magnetic field comprising, a plurality of magnetic cores, means for mounting said magnetic cores in spaced relationship along substantially the entire length of travel of said magnetic element and adjacent thereto, magnetic field producing means located to induce said extraneous magnetic field along at least one path in said element, a plurality of position indicating coils wound individually upon said cores, each of said cores and said coils always being disposed at an angle to the path of said extraneous field through said magnetic element, and circuit means for coupling said coils to a source of fluctuating potential and to external inductance measuring circuitry.

3. In combination with a movable magnetic element mounted for movement in na extraneous magnetic field, a plurality of magnetic cores, means for mounting said magnetic cores in spaced relationship along substantially the entire length of travel of said magnetic element and adjacent thereto, magnetic field producing means located to induce said extraneous magnetic field along at least one path in said element, a plurality of position indicating coils wound individually upon said cores, each of said cores always being disposed at an angle to the path of said extraneous magnetic field through said magnetic element, and circuit means for coupling said coils to a source of fluctuating potential and to external inductance measuring circuitry.

4. In combination with a magnetic tubular element mounted for movement in an extraneous magnetic field, a plurality of position indicating coils, magnetic field producing means located to induce said extraneous magnetic field along at least one path in said element, means for spacing said coils substantially along the length of travel of said tubular element and for mounting said coils for insertion within said element upon movement of said element, said coils being further disposed such that the paths of their individual magnetic fluxes through said elements always lie at angles to that of the flux of said extraneous field through said element, and circuit means for coupling said coils to a source of fluctuating potential and to external inductance measuring circuitry.

5. In a position indicator for indicating the position of a movable magnetic element, the combination comprising a pair of spaced substantially parallel side members, a plurality of magnetic cores spaced along the length of said side members and transversely secured thereto, a plurality of position indicating coils individually wound upon said cores, said coils and cores being disposed such that the fluxile path of each of said coils lies at an angle to the direction of travel of said moving element adjacent said coils respectively, means for mounting said side members adjacent said movable element, and circuit means for coupling said coils to a source of fluctuating potential and to said coils to external inductance measuring circuitry.

6. A position indicating arrangement for indicating the position of a movable magnetic tubular element, said indicator comprising a pair of spaced side members, a plurality of magnetic core members disposed along substantially the length of travel of said element, means for transversely securing said core members to said side members, a plurality of position indicating coils wound individually upon said core members, said coils and said core members being disposed such that the fluxile path of each said coils through said tubular element lies at a substantially right angle to the direction of movement of said tubular element adjacent said coils respectively, a tubular casing surrounding said coils and side members, said casing being arranged for insertion into said movable tubular element, and circuit means for coupling said coils to a source of fluctuating potential and to external inductance measuring circuitry.

7. In a position indicator for indicating the position of a magnetic element arranged for movement in a prescribed course, the combination comprising a pair of spaced substantially parallel side members, said side members being fabricated from an electrically conductive material, means for mounting said side members adjacent said element and substantially parallel to said course, a plurality of magnetic cores spaced along the length of said side members and substantially transversely secured thereto, said side members each having a plurality of slots formed therein and individually extending from each of said cores to a lateral edge of said side members, a plurality of position indicating coils individually wound upon said cores, and circuit means for coupling said coils to a source of fluctuating potential and to external inductance measuring circuitry.

8. In a position indicator for indicating the position of a magnetic element arranged for movement in a prescribed path, the combination comprising a pair of spaced substantially parallel side members; said side members being fabricated from an electrically conductive material, means for mounting said members adjacent said element and substantially parallel to said path; a plurality of magnetic cores spaced along the length of said side members and substantially transversely secured thereto, said cores being secured centrally of the lateral edges of said side members, said side members each having a plurality of slots formed therein and extending individually from said cores to the lateral edges of each said side members with alternate ones of said slots in at least one side member extending to the same lateral edge thereof, a plurality of position indicating coils individually wound upon said cores; and circuit means for coupling said coils to a source of fluctuating potential and to external inductance measuring circuitry.

9. A linear motion device comprising a housing, a stator mounted in said housing, a rotor mounted for rotative movement adjacent said stator, a magnetic movable element mounted for substantially linear movement relative to said rotor and adjacent thereto, driving means joined to said rotor and detachably engaging said movable element, inductive position indicating means mounted in said housing at a position adjacent said element, said indicating means comprising a plurality of position indicating coils spaced along the length of said indicating means and disposed such that the individual fluxile paths thereof lie at angles to those of said rotor and said stator through said element, and circuit means coupling said coils to a source of fluctuating potential and to external inductance measuring circuitry.

10. A linear motion device comprising an elongated housing, a stator mounted in said housing, a rotor having a channel extending therethrough and mounted for relative movement adjacent said stator, a tubular magnetic movable element mounted for substantially linear movement relative to said rotor and extendable through said channel, driving means joined to said rotor for detachably engaging said movable element, inductive position indicating means joined to an end of said housing, said position indicating means extending through said rotor channel and insertable into said tubular element upon movement thereof, said indicating means in addition comprising a plurality of position indicating coils spaced along the length of said indicating means and disposed such that the individual fluxile paths thereof through said element lie at substantial angles to the direction of the fluxile paths of said stator and said rotor through said movable element, and circuit means for coupling said coils to a source of fluctuating potential and to external inductance measuring circuitry.

11. A linear motion device comprising a housing, a stator mounted in said housing, a rotor having a channel extending therethrough mounted for rotative movement adjacent said stator, a magnetic movable tubular element mounted for substantially linear movement relative to said rotor and extendable through said channel, driving means joined to said rotor for detachably engaging said movable element, electromagnetic means mounted in said housing for controlling the engagement and disengagement of said driving means with said element, inductive position indicating means joined to an end of said linear motion device, said position indicating means extending through said rotor channel and insertable into said tubular element upon movement thereof, said indicating means in addition comprising a plurality of position indicating coils spaced along the length of said indicating means such that the individual fluxile paths thereof lie at angles to the direction of the fluxile path of said electromagnetic means through said moving element, and circuit means coupling said coils to a source of fluctuating potential and to external inductance measuring circuitry.

12. The linear motion device according to claim 9 wherein electromagnetic means are mounted adjacent said element for controlling the engagement and disengagement of said driving means with said element and wherein the individual fluxile paths of said coils through said element in addition lie at angles to the fluxile path of said electromagnetic means through said element.

13. In a position indicator for indicating the position of a magnetic element arranged for movement along a prescribed course extending into a plurality of extraneous magnetic fields, the combination comprising a plurality of position indicating coils spacedly mounted along the length of said source in gap-bridgeable relationship with said element, magnetic field producing means located to induce said extraneous magnetic fields along at least one path in said element, at least those coils adjacent said extraneous fields, respectively, being further arranged such that their fluxile paths through said element are always disposed at angles respectively to the fluxile paths of said extraneous fields through said element, and circuit means for coupling said coils to a source of fluctuating potential and to external inductance measuring circuitry.

14. In a position indicator adapted for use in an extraneous magnetic field for indicating the position of an element arranged for movement through a prescribed course, said element being fabricated at least partly from a magnetic material, the combination comprising magnetic field producing means located to induce said extraneous magnetic field along at least one path in said element, at least one position indicating coil mounted in variable magnetic gap bridgeable relationship to said element upon movement thereof, said coil being further disposed such that its fluxile path through said element is always at an angle to that of said extraneous magnetic field through said element, and circuit means for coupling said coil to a source of fluctuating potential and to external circuitry for measuring the inductance of said coil.

References Cited in the file of this patent

UNITED STATES PATENTS

| | | |
|---|---|---|
| 2,369,909 | Mestas | Feb. 20, 1945 |
| 2,428,234 | Mapp | Sept. 30, 1947 |
| 2,543,843 | Frosch | Mar. 6, 1951 |
| 2,569,106 | James et al. | Sept. 25, 1951 |
| 2,627,119 | Graham | Feb. 3, 1953 |
| 2,782,365 | Castel | Feb. 19, 1957 |
| 2,782,376 | Mortimer | Feb. 19, 1957 |
| 2,802,185 | Dewitz | Aug. 6, 1957 |
| 2,810,880 | Buccicone | Oct. 22, 1957 |
| 2,916,690 | Leete | Dec. 8, 1959 |

FOREIGN PATENTS

| | | |
|---|---|---|
| 878,495 | France | Oct. 12, 1942 |
| 737,882 | Germany | July 28, 1943 |